US008693691B2

(12) United States Patent
Jacobs

(10) Patent No.: US 8,693,691 B2
(45) Date of Patent: Apr. 8, 2014

(54) EMBEDDED AUTHENTICATION PROTOCOL FOR QUANTUM KEY DISTRIBUTION SYSTEMS

(75) Inventor: Bryan C. Jacobs, Sykesville, MD (US)

(73) Assignee: The Johns Hopkins University, Baltimore, MD (US)

( * ) Notice: Subject to any disclaimer, the term of this patent is extended or adjusted under 35 U.S.C. 154(b) by 82 days.

(21) Appl. No.: 13/480,554

(22) Filed: May 25, 2012

(65) Prior Publication Data
US 2013/0315395 A1    Nov. 28, 2013

(51) Int. Cl.
*H04L 29/06*    (2006.01)

(52) U.S. Cl.
USPC ........................................................ 380/278

(58) Field of Classification Search
USPC ......................................... 380/278; 713/168
See application file for complete search history.

(56) References Cited

U.S. PATENT DOCUMENTS

| | | | |
|---|---|---|---|
| 7,333,611 B1 | 2/2008 | Yuen et al. | |
| 7,436,961 B2 | 10/2008 | Mitchell et al. | |
| 7,539,314 B2 | 5/2009 | Berzanskis et al. | |
| 7,653,199 B2 * | 1/2010 | Renes | 380/256 |
| 7,734,757 B2 * | 6/2010 | Maeda et al. | 709/223 |
| 7,881,472 B2 * | 2/2011 | Matsumoto | 380/260 |
| 7,889,868 B2 * | 2/2011 | Wellbrock et al. | 380/263 |
| 2004/0267847 A1 | 12/2004 | Harper | |
| 2006/0018475 A1 | 1/2006 | Vig et al. | |
| 2006/0059343 A1 * | 3/2006 | Berzanskis et al. | 713/171 |
| 2006/0198521 A1 | 9/2006 | Young et al. | |
| 2006/0263096 A1 | 11/2006 | Dinu et al. | |
| 2007/0014415 A1 | 1/2007 | Harrison et al. | |
| 2007/0058810 A1 | 3/2007 | Tanaka et al. | |
| 2007/0092083 A1 | 4/2007 | Young et al. | |
| 2007/0140495 A1 | 6/2007 | Berzanskis et al. | |
| 2007/0192598 A1 | 8/2007 | Troxel et al. | |
| 2008/0052577 A1 | 2/2008 | Tanaka et al. | |
| 2009/0113267 A1 * | 4/2009 | Harrison et al. | 714/746 |
| 2009/0169015 A1 * | 7/2009 | Watanabe | 380/278 |
| 2009/0204657 A1 | 8/2009 | Goettfert et al. | |
| 2012/0314867 A1 * | 12/2012 | Tomaru | 380/270 |

* cited by examiner

*Primary Examiner* — Ali Abyaneh
(74) *Attorney, Agent, or Firm* — Noah J. Hayward

(57) ABSTRACT

In methods and systems to authenticate systems in a quantum key distribution environment based on limited disclosures and identical, re-usable, pre-provisioned authentication keys, each system constructs an encryption key based on a corresponding one of transmitted events and detected events. Basis-sifting, error detection, error correction, and/or privacy amplification (PA) may be performed on the encryption keys based on limited disclosures (e.g., detection interval information, basis-sifting information, associated detection basis information, and/or parity measures). The authenticated keys may be modified based on disclosed detection information. Error detection and/or PA may be performed with identical pre-provisioned algorithms and pseudo-random values generated from the authenticated keys or modified authenticated keys. Final authenticated encryption keys are selectively constructed depending upon an extent of detected errors. Construction of authenticated encryption keys indicates authentication of the systems. None of the pre-provisioned authentication keys or modified authentication keys is disclosed and may thus be reused.

22 Claims, 6 Drawing Sheets

EMBEDDED AUTHENTICATION PROTOCOL FOR QUANTUM KEY DISTRIBUTION SYSTEMS

BACKGROUND OF THE INVENTION

1. Field of the Invention

The present disclosure relates to methods and systems to secure communications and, more particularly, to methods and systems to secure communications of encrypted data using quantum cryptography, including to employ embedded authentication keys to inherently authenticate users during error detection and/or privacy amplification portions of a Quantum Key Distribution (QKD) protocol.

2. Description of the Related Art

Quantum cryptography is the use of quantum systems to do cryptographic tasks. A well-known example is quantum key distribution (QKD), which uses quantum mechanics to guarantee secure communication. It enables two parties to produce a shared random bit string known only to them which can be used as a key to encrypt and decrypt messages.

An important and unique property of quantum cryptography is the ability of the two communicating users to detect the presence of any third party trying to gain knowledge of the key. This is due to fundamental aspect of quantum mechanics: the process of measuring a quantum system in general disturbs the system. A third party trying to eavesdrop on the key must in some way measure it, thus introducing detectable anomalies.

By using quantum super-positions or quantum entanglement and transmitting information in quantum states, a communication system may be implemented to detect eavesdropping. If the level of eavesdropping is below a certain threshold, a secure key may be produced for which the eavesdropper has insufficient or no information. Otherwise, generation of a secure key may not be possible and communication may be aborted.

Quantum cryptography is used to produce and distribute a key to authenticated users, not to transmit subsequent message data. The key may be used with an encryption algorithm to encrypt and decrypt the message data. The encrypted message data may be transmitted over a conventional unsecured communication channel. Conventional QKD encryption algorithms include a one-time pad.

Quantum communication involves encoding information in quantum states, or qubits, such as quantum states of photons. Quantum cryptography exploits certain properties of quantum states to ensure security.

In contrast to classical physics, the act of measurement is an integral part of quantum mechanics. In general, measuring an unknown quantum state changes that state in some way. This is known as quantum indeterminacy, and underlies results such as the Heisenberg uncertainty principle, information-disturbance theorem, and no-cloning theorem. As noted above, this can be exploited in order to detect eavesdropping on a communication channel, which necessarily involves measurement, and to determine an amount of information that may have been intercepted.

The quantum states of two (or more) separate objects may become linked together in such a way that they must be described by a combined quantum state rather than as individual objects. This is known as entanglement and means that, for example, joint measurements of a pair may be completely correlated even though the result is completely random. If an entangled pair of objects is shared between two parties, anyone intercepting either object alters the overall system, revealing the presence of the third party and the amount of information they have gained.

These approaches may each be further divided into three families of protocols: discrete variable, continuous variable and distributed phase reference coding. Discrete variable protocols were developed first and remain the most widely implemented. The other two families are mainly concerned with overcoming practical limitations of experiments. The two protocols described below both use discrete variable coding.

A BB84 protocol was originally described using photon polarization states to transmit the information. However, any two pairs of conjugate states can be used for the protocol, and many optical fiber based implementations described as BB84 use phase encoded states.

A sender and a receiver, conventionally referred to as Alice and Bob, respectively, are connected by a quantum communication channel to transmit quantum states. In the case of photons, a quantum channel may include an optical fiber or free space. Alice and Bob may also communicate via a non-secure or classical channel, such as broadcast radio or the Internet. The BB84 protocol is designed to be secure even with the assumption that an eavesdropper has access to all of the classical (non-secure) communications.

The security of the BB84 protocol comes from encoding information in non-orthogonal states. Quantum indeterminacy means that these states cannot in general be measured without disturbing the original state (see, no cloning theorem). BB84 uses two pairs of states, with each pair conjugate to the other pair, and the two states within a pair orthogonal to each other. Pairs of orthogonal states are referred to as a basis. Polarization state pairs include a rectilinear basis of vertical (0°) and horizontal (90°), and a diagonal basis of 45° and 135° or the circular basis of left and right-handedness. Any two of these bases are conjugate to each other, and so any two can be used in the protocol. In the example of Table 1 below, rectilinear and diagonal bases are used.

TABLE 1

| Basis | 0 | 1 |
|---|---|---|
| + | ↑ | → |
| × | ↗ | ↘ |

The first step in BB84 is quantum transmission. Alice creates a random bit (0 or 1) and then randomly selects one of her two bases (rectilinear or diagonal in this case). Alice then prepares a photon polarization state depending both on the bit value and basis, as shown in Table 1. For example, a 0 is encoded in the rectilinear basis (+) as a vertical polarization state, and a 1 is encoded in the diagonal basis (x) as a 135° state. Alice then transmits a single photon in the state specified to Bob, using the quantum channel. This process is then repeated from the random bit stage, with Alice recording the state, basis and time of each photon sent.

According to quantum mechanics, particularly quantum indeterminacy, no possible measurement distinguishes between the 4 different polarization states, as they are not all orthogonal. The only possible measurement is between any two orthogonal states (a basis). For example, measuring in the rectilinear basis gives a result of horizontal or vertical. If the photon was created as horizontal or vertical, as a rectilinear eigenstate, then this measures the correct state, but if the photon was created as 45° or 135° (diagonal eigenstates) then the rectilinear measurement instead returns either horizontal or vertical at random. Furthermore, after this measurement the photon is polarized in the state it was measured in (horizontal or vertical), with all information about its initial polarization lost.

As Bob does not know the basis the photons were encoded in, Bob selects a basis at random to measure in, either rectilinear or diagonal. Bob does this for each received photon, recording the time, measurement basis used and measurement result. After Bob has measured all the photons, Bob communicates with Alice over the classical channel. Alice broadcasts the basis each photon was sent in, and Bob broadcasts the basis each was measured in. Alice and Bob discard photon measurements (bits) where Bob used a different basis, which is half on average, leaving half the bits as a shared key. This is illustrated in Table 2 below.

TABLE 2

| Alice's random bit | | | | | | | | |
|---|---|---|---|---|---|---|---|---|
| | 0 | 1 | 1 | 0 | 1 | 0 | 0 | 1 |
| Alice's random sending basis | + | + | X | + | X | X | X | + |
| Photon polarization Alice sends | ↑ | → | ↘ | ↑ | ↘ | ↗ | ↗ | → |
| Bob's random measuring basis | + | X | X | X | + | X | + | + |
| Photon polarization Bob measures | ↑ | ↗ | ↘ | ↗ | → | ↗ | → | → |

To check for the presence of eavesdropping, Alice and Bob compare a certain subset of their remaining bit strings. If a third party has gained any information about the photons' polarization, this introduces errors in Bobs' measurements. If more than p bits differ, Alice and Bob abort the key and try again, possibly with a different quantum channel, as the security of the key cannot be guaranteed. p is chosen so that if the number of bits known to Eve is less than this, privacy amplification can be used to reduce Eve's knowledge of the key to an arbitrarily small amount, by reducing the length of the key.

The Ekert scheme uses entangled pairs of photons. These can be created by Alice, by Bob, or by some source separate from both of them, including eavesdropper Eve. The photons are distributed so that Alice and Bob each end up with one photon from each pair.

The scheme relies on two properties of entanglement. First, the entangled states are perfectly correlated in the sense that if Alice and Bob both measure whether their particles have vertical or horizontal polarizations, they always get the same answer with 100% probability. The same is true if they both measure any other pair of complementary (orthogonal) polarizations. However, the particular results are completely random; it is impossible for Alice to predict if she (and thus Bob) will get vertical polarization or horizontal polarization. Second, any attempt at eavesdropping by Eve destroys these correlations in a way that Alice and Bob can detect.

The quantum cryptography protocols described above provide Alice and Bob with nearly identical shared keys, and also with an estimate of the discrepancy between the keys. These differences can be caused by eavesdropping, but also by imperfections in the transmission line and detectors. As it is impossible to distinguish between these two types of errors, guaranteed security requires the assumption that all errors are due to eavesdropping. Provided the error rate between the keys is lower than a certain threshold, two steps can be performed to first remove the erroneous bits and then reduce Eve's knowledge of the key to an arbitrary small value. These two steps are known as information reconciliation and privacy amplification, respectively.

Information reconciliation is a form of error correction carried out between Alice and Bob's keys in order to ensure both keys are identical. It is conducted over the public channel and as such it is vital to minimize the information sent about each key, as this can be read by Eve.

A common protocol used for information reconciliation is the cascade protocol. This operates in several rounds, with both keys divided into blocks in each round and the parity of those blocks compared. If a difference in parity is found then a binary search is performed to find and correct the error. If an error is found in a block from a previous round that had correct parity then another error must be contained in that block; this error is found and corrected as before. This process is repeated recursively. After all blocks have been compared, Alice and Bob both reorder their keys in the same random way, and a new round begins. At the end of multiple rounds, it is highly probable that Alice and Bob have identical keys, however, Eve has additional information about the key from the parity information exchanged.

Privacy Amplification is a method for reducing (and effectively eliminating) Eve's partial information about Alice and Bob's key. This partial information could have been gained both by eavesdropping on the quantum channel during key transmission (thus introducing detectable errors), and on the public channel during information reconciliation (where it is assumed Eve gains all possible parity information).

Privacy amplification uses Alice and Bob's key to produce a new, shorter key, in such a way that Eve has only negligible information about the new key. This can be done using a universal hash function, chosen at random from a publicly known set of such functions, which takes as its input a binary string of length equal to the key and outputs a binary string of a chosen shorter length. The amount by which this new key is shortened is calculated, based on how much information Eve could have gained about the old key (which is known due to the errors this would introduce), in order to reduce the probability of Eve having any knowledge of the new key to a very low value.

The protocols described above generally rely on algorithmic authentication protocols, such as SHA256, or classical encryption to establish trust in the communications with the other party. This is required to defeat a "man-in-the-middle" attack wherein an adversary is capable of manipulating all communications between the sender and receiver. When classical encryption is used the required key material is usually taken from the QKD output, thus greatly reducing the secret keys available to encrypt user data. Additionally, as noted above, typical implementations employ the use of random hash functions which must be generated by one party and communicated to the other. Both problems increase the required communications overhead.

SUMMARY OF THE INVENTION

Disclosed herein are methods and systems to authenticate first and second communication systems or users (e.g., Alice and Bob), based on pre-provisioned secret authentication keys, without disclosure or consumption of any portion of the authentication keys. The authentication keys may thus be reused. A summarized example is provided below.

The first system transmits events as quantum states over a quantum communication channel during corresponding transmission intervals, and the second system detects events of the quantum channel based on random quantum detection bases. An event may be defined in terms of a bit value, a quantum basis, and transmission or detection interval. In an optical quantum implementation, quantum bases are defined in terms of polarization bases.

The first system generates a first raw key based on transmission events, and the second system generates a second raw key based on detection events.

The second system openly discloses detection bases and detection intervals of detection events, and maintains detection quantum states and corresponding bit values in secret.

The first system modifies the first raw key based on the disclosed detection interval information.

The first system also compares the disclosed detection bases with the transmit bases to identify mismatches, and discloses sifting or keep/discard indications for each of the detection bases.

The first and second systems sift the corresponding raw keys based on the bases mismatches to provide corresponding first and second sifted keys.

The first and second systems also modify the corresponding pre-provisioned authentication keys based on the disclosed detection interval information and the bases mismatches. Absent an eavesdropper and/or transmission errors, the modified pre-provisioned authentication keys remain identical to one another.

The first and second systems perform error detection based on values generated from the corresponding modified authentication keys. The modified authentication keys may be used to seed identical pseudo-random number generators, outputs of which may be used to pseudo-randomly arrange bits of the corresponding sifted keys. Parity values may be computed for the pseudo-randomly arranged bits, in private, based on pre-provisioned technique or algorithm. The parity information may be openly disclosed, and errors may be detected and corrected/eliminated privately, to provide corresponding first and second corrected keys.

The corrected keys may be selectively retained or discarded based on a size of, or number of bits remaining in the corrected keys. Where the corrected keys are retained, the first and second systems may be inherently authenticated with respect to one another.

Alternatively, additional security enhancements may be provided, such as privacy amplification (PA). Privacy amplified keys may be constructed from parity values of the corrected keys. The parity values may be computed, privately, based on pseudo-randomly arranged bits of the corrected keys, such as described above with respect to parity-based error identification.

The second system may add noise, in the form of random detection events, to the detected events, and thus to the raw keys, which may reduce information that an adversary might potentially learn about the secret authentication key.

Methods and systems disclosed herein may permit authentication of classical messages in a Quantum Key Distribution (QKD) protocol without overhead resources normally required. The overhead is reduced because QKD secret keys can be reused, and conventional long random sequences do not need to be exchanged for error correction or privacy amplification. Instead, the secret embedded or pre-provisioned authentication key is used to generate the sequences, such as hash functions, locally.

The secret embedded authentication key is used within error correction and/or privacy amplification stages of the protocol.

In an embodiment, the initial authentication key can be seen as a "pre-placed" or "startup" secret key. In another embodiment, Alternatively, the authentication procedure may be used to augment a conventional approach that uses algorithmic authentication to establish a first set of QKD keys, and then uses systems and methods disclosed herein thereafter.

Additional features are summarized below.

A QKD receiver may include a hardware-based true random number generator (HRNG) to add fictitious detection events to a raw QKD detection bit stream, which may to mask information about the embedded authentication key. The authentication key can be a relatively long random sequence, which may be used directly during an authentication session, or it may be indexed and a given segment may be used to seed a pseudo random number generator (PRNG) to generate an authentication key for a given session.

A QKD transmitter and a QKD receiver may use the detection event information, basis sifting information, and the secret (session) authentication key to initialize a pseudo random number generator (PRNG). These information streams may be combined in one or more of a variety of ways, such as XOR'd, to generate an initial seed for a key generator, which may adhere to an the Advanced Encryption Standard (AES) algorithm.

Two parties may perform error detection, with or without correction, using a universal hash function derived from the secretly initialized PRNG's. This can be done as normally specified in the literature, or as in the matrix shuffling algorithm described below. Error estimation may be performed as conventionally, and may be managed by the receiver so that random/fictitious detection events added by the receiver can be excluded by the receiver.

Privacy Amplification (PA) may be performed based on the internal PRNG's, similar to error detection, but without open information exchange other than perhaps a desired or require level of PA.

Authentication is achieved/verified during error correction/detection implicitly based on the presumption that only the legitimate QKD nodes know the authentication key, and thus know how to combine the raw bits during error detection and PA. Unauthorized use is indicated by high error rates, or an error elimination scheme that fails to converge. Additionally, the embedded authentication key is not consumed because no information about it is transmitted during the protocol.

BRIEF DESCRIPTION OF THE DRAWINGS

The above and other features and advantages will become more readily apparent from the detailed description of the invention, accompanied by the drawings, in which.

Figure 1:
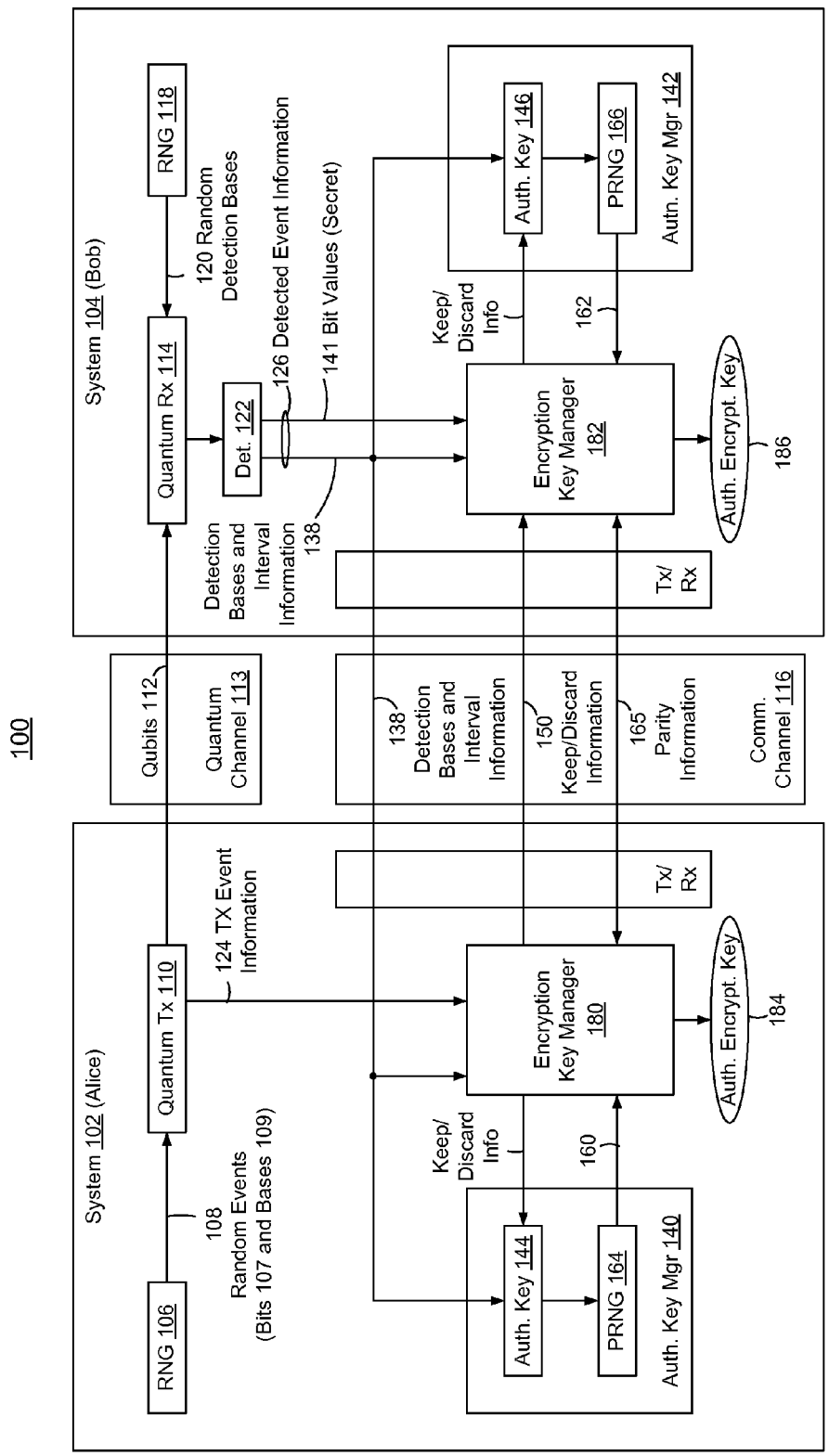
FIG. 1 is a block diagram of and first and second systems (e.g., Alice and Bob), to authenticate one other with relatively limited disclosures based on corresponding pre-provisioned or embedded secret authentication keys, and without disclosure or consumption of the authentication keys.

Similar such computer systems may be implemented each of a QKD transmit system and a QKD receive system.

In the drawings, the leftmost digit(s) of a reference number identifies the drawing in which the reference number first appears.

DETAILED DESCRIPTION

In the following discussion, numerous specific details are set forth to provide a thorough understanding of exemplary embodiments the present invention. However, those skilled in the art will appreciate that additional exemplary embodiments of the present invention may be practiced without such specific details. In other instances, well-known elements have been illustrated in schematic or block diagram form in order not to obscure exemplary embodiments of the present invention in unnecessary detail.

FIG. 1 is a block diagram of an first and second systems 102 and 104 (e.g., Alice and Bob), to implicitly or inherently authenticate one other with relatively limited exchange of information, based on corresponding pre-provisioned or embedded secret authentication keys 144 and 146, and without disclosure or consumption of the authentication keys.

Systems 102 and 104 are described below with reference to the BB84 Quantum Key Distribution (QKD) protocol. Methods and systems disclosed herein are not, however, limited to this example.

System 102 includes an event generator, illustrated here as a random number generator (RNG) 106 to generate events 108. Events 108 may include bit values 107 and corresponding transmit bases 109, such as polarization bases.

System 102 further includes a quantum transmitter 110 to encode bits 107 as quantum states or quantum bits (qubits) 112 in accordance with bases 109, and to transmit qubits 112 over a quantum communication channel 113, each during a corresponding transmission interval.

Quantum transmitter 110 may include a photon transmitter to transmit qubits 112 as polarized photons, and quantum communication channel 113 may include an optical communication channel such as an optical fiber.

Quantum transmitter 110 may control polarization with voltages applied to three Pockels cells, and may drive two of the Pockels cells in parallel with one another.

System 104 includes a quantum receiver 114, which may perform polarization measurements in one of two non-orthogonal bases. Quantum Receiver 114 may include a Pockels cell to controllably rotate received photons or light by 45 degrees, and a polarization analyzer to analyze outputs of the Pockels cell. Basis selection may be determined by a voltage applied to the receiver Pockels cell.

System 104 further includes a basis generator, illustrated here as a RNG 118, to generate random detection polarization bases 120 to be used by receiver 114 to analyze photons received over quantum channel 113.

RNGs 106 and 118 may be implemented in software and/or hardware, and may be implemented to generate true random numbers, as opposed to pseudo-random numbers. Where a pseudo-random number generator (PRNG) is used, seed values may be assigned via a combination of user input and a real-time clock of a computer system. Alternatively, the seed values may be set to fixed values, such as for test purposes. Additionally, the pseudo-random sequences may be overridden for testing.

Transmitter 110 and receiver 114 may be implemented to control voltages of corresponding Pockels cells via digital to analog converters (DACs). A sequence of voltages may be applied to a set of Pockels cells by filling memory buffers with the appropriate values and executing a transfer.

Systems 102 and 104 may be implemented to coordinate communication and/or control parameters with one another, such as clock rate, number of transfers, and/or other parameters. One or more of the parameters may be user-controllable and/or may be established by software at each of systems 102 and 104. Systems 102 and 104 may communicate with one another over another communication channel 116, such as an Ethernet link, to coordinate transmission parameters.

Systems 102 and 104 may communicate openly over channel 116, such as without encryption and/or user authentication.

After communication parameters are established, a DAC buffer of transmitter 110 may be loaded with a sequence of polarization states based on bits 107 and bases 109.

Similarly, a DAC buffer of receiver 114 may be loaded in accordance with bases 120. Systems 102 and 104 may include similar logic (hardware and/or software) to load the respective DAC buffers and/or to generate additional buffers to store polarization and basis selection information for subsequent processing.

After the DAC buffers are prepared, settings relating to clock rate and/or timing synchronization may be adjusted prior to transmission of qubits 112. The setting may include hardware-based settings.

During transmission, data loaded in the transmitter DAC buffers may be used to modulate Pockels cell voltages. Relative timing of optical pulse generation at transmitter 110 and/or detector coincidence gating at receiver 114 may be controlled during transmission, such as with external logic boards.

Receiver 114 may include first and second analog-to-digital converters (ADCs) and corresponding ADC buffers to record events of channel 113 based on detection polarization bases 120. The first and second receiver ADCs may run concurrently with the receiver DAC buffers.

System 104 further includes a detector 122 to detect events 126 of quantum channel 113 based on analysis of the receiver ADC buffers, detection intervals, and/or transmission intervals. Detection events 126 may include detection polarization bases and detection interval information 138, and bit values 141. Detection may be initiated upon completion of a transfer of a sequence of qubits 112.

Receiver 114 may interleave data from the two receiver ADCs into a common or shared buffer, and detector 122 may determine timing offsets to extract the interleaved data. Detector 122 may identify and discard intervals for which events are recorded in both of the receiver ADCs.

Systems 102 and 104 include respective authentication key managers 140 and 142, to manage respective identical pre-provisioned authentication keys 144 and 146. Authentication key managers 140 and 142 may modify corresponding authentication keys 144 and 146 during an authentication session based on information disclosed over channel 116 such that, absent an eavesdropper on quantum channel 113 and/or transmission errors, authentication keys 144 and 146 should remain identical to one another even after modification.

Systems 102 and 104 further include corresponding encryption key managers 180 and 182 to generate respective raw encryption keys based on a corresponding one of transmit event information 124 and detection event information 126 and subsequent information disclosures.

Disclosed information may include detection bases and detection interval information 138, basis sifting information related to detected events (keep/discard sifting information 150), and parity information 165. The information may be exchanged or disclosed openly over channel 116, such as without encryption and/or user authentication.

Encryption key managers 180 and 182 may include identical pre-provisioned algorithms to privately perform functions related to sifting, error detection, error correction, and/or privacy amplification with respect to the corresponding raw encryption key, to provide corresponding authenticated encryption keys 184 and 185.

The pre-provisioned algorithms may be seeded with values generated from authenticated keys 144 and 146 and/or authenticated keys, such that when encryption key managers 180 and 182 converge on solutions for the corresponding authenticated encryption keys 184 and 186, systems 102 and 104 are inherently or implicitly authenticated with respect to one another. Authentication may be performed without exchange of encrypted authentication keys, bit values, sifting algorithms, error detection and/or correction algorithms, and/or privacy amplification algorithms.

In FIG. 1, authentication key managers 140 and 142 include identical pseudo random number generators (PRNGs) 164 and 166, respectively, to generate sequences of random values 160 and 162, using the corresponding modified authentication keys to seed the PRNGs. PRNGs 164 and 166 may be implemented in software, hardware, and/or combinations thereof. Where modified authenticated keys 144 and 146 are identical to one another, sequences of values 160 and 162 are identical to one another.

Figure 2:
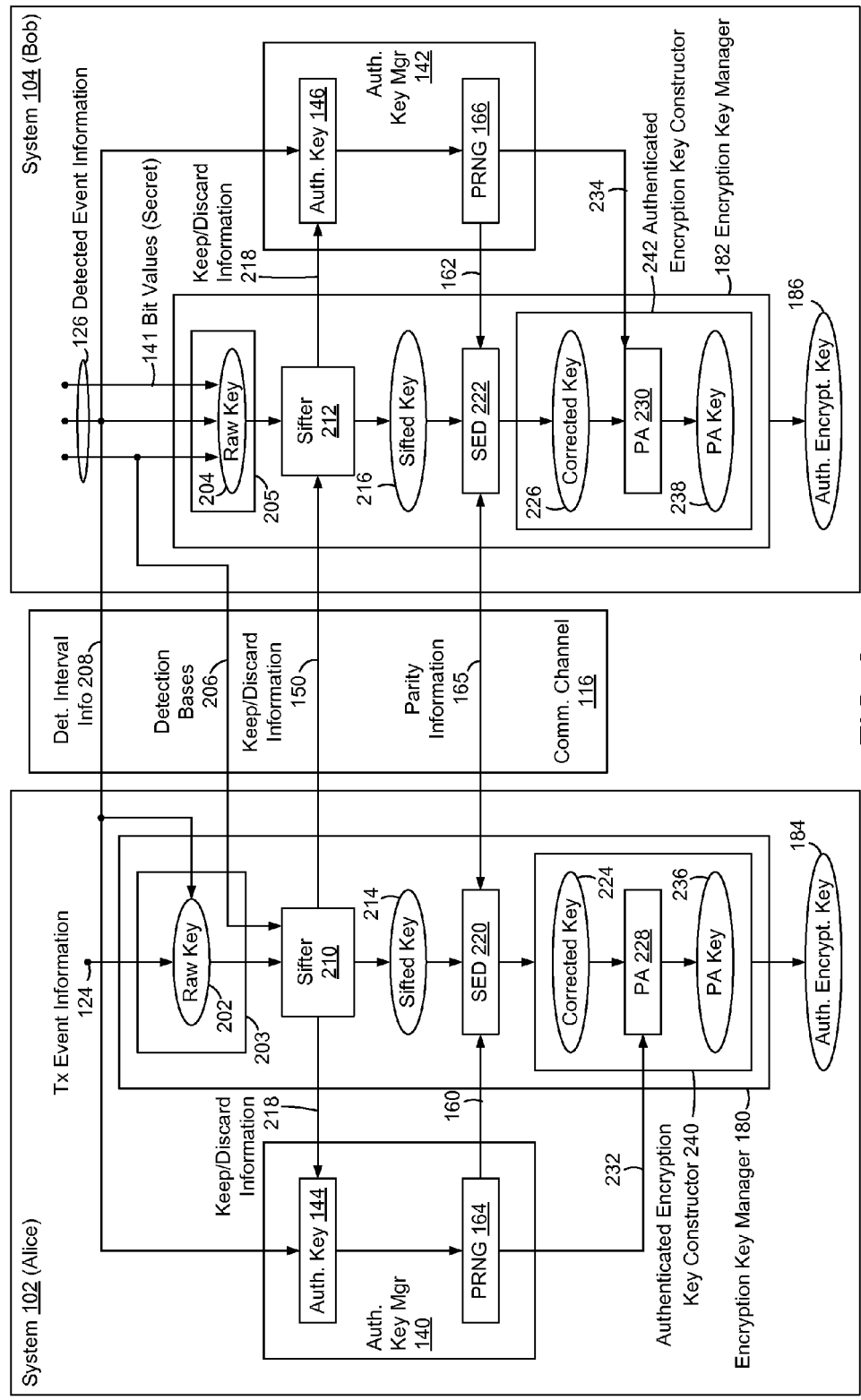
FIG. 2 is a block diagram of portions of the first and second systems of FIG. 1.

FIG. 2 is a block diagram of portions of systems 102 and 104 to illustrate example implementations of encryption key managers 180 and 182. Methods and systems disclosed herein are not, however, limited to the example of FIG. 2.

In FIG. 2, encryption key managers 180 and 182 include respective encryption key generators 203 and 205 to generate corresponding initial encryption keys, illustrated here as raw keys 202 and 204. Raw key 202 is generated from transmit event information 124. Raw key 204 is generated from detection event information 126. Raw keys 202 and 204 may include bit values, polarization bases, and transmission/detection interval information. Raw key 202 may represent every polarization transmitted during an authentication session. Raw key 204 may represent all detected polarizations.

Raw keys 202 and 204 may differ from one another. For example, system 104 may not detect every event transmitted by system 102 due to low transmission intensity, channel loss, detection inefficiencies, and/or coupling inefficiencies. In addition, system 104 optionally inserts fictitious events at random detection intervals to valid detection events 126, such as described further below with reference to FIG. 4. Where system 104 adds fictitious events to detection events 126, the fictitious events may be included in raw key 204 but not raw key 202.

In FIG. 2, system 104 discloses detection bases 206 and detection interval information 208 over channel 116, and maintains bit values 141 as secret.

Encryption key manager 180 modifies raw key 202 based on detection bases 206. This may include comparison of detection interval information 208 to transmission interval information of raw key 202, and discarding events from raw key 202 for which there are no corresponding detection events in raw key 204.

In addition, authentication key managers 140 and 142 modify corresponding authentication keys 144 and 146 based on detection interval information 208.

Encryption key managers 180 and 182 include respective sifters 210 and 212 to sift or discard events from raw keys 202 and 204 based on mismatches or non-correlations of transmission and detection bases, also referred as basis-sifting.

Sifter 210 compares detection bases 206 to transmission bases of raw key 202 to identify mismatches. Sifter 210 discards uncorrelated transmission events from raw key 202 to provide a sifted key 214. Sifter 210 also discloses a keep/discard indication 150 over channel 116 for each detection basis 206. Sifter 212 discards uncorrelated detection events from raw key 204 based on keep/discard indications 150 to provide a sifted key 216.

Sifters 210 and 212 may further provide sifted basis information, such as keep/discard indications 150, to corresponding authentication key managers 140 and 142 to further modify corresponding authentication keys 144 and 146.

Modifications of authentication keys 144 and 146 may be performed with one or more identical pre-provisioned algorithms.

Figure 4:
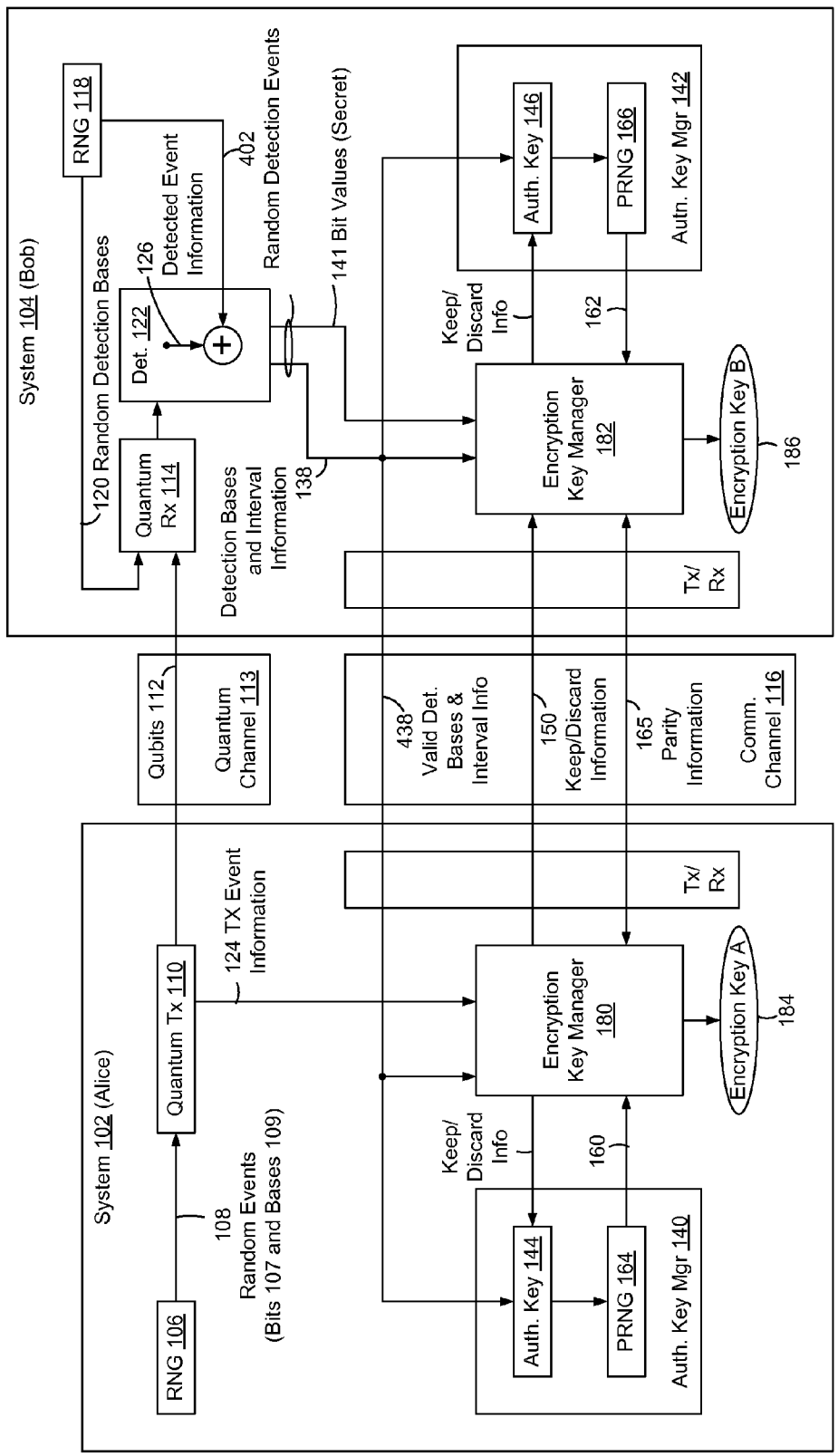
FIG. 4 is a block diagram of the firsts and second systems, where the second system is implemented to insert noise into a detection stream in the form of fictitious or random detection events.

Sifted keys 214 and 216 should be similar to one another, with possible exceptions due to transmission errors, errors introduced by an adversary, and/or fictitious detection events (FIG. 4).

Additional quantum events 108 may be transmitted by system 102, and sifting may be repeated, to accumulate a minimum sifted-key block size, which may be user-configurable. A default minimum block size may be set to, for example, 900.

Systems 102 and 104 may be implemented to privately identify errors in sifted keys 214 and 216 through disclosure of parity information over channel 116. Parity may be based on subsets of sifted keys 214 and 216. Systems 102 and 104 may be further implemented to privately correct and/or eliminate errors in the corresponding sifted keys.

In FIG. 2, encryption key managers 180 and 182 include identical error detection modules, illustrated here as respected secure error detection modules (SEDs) 220 and 222. SEDs 220 and 222 may privately compute parity values for bits of corresponding sifted keys 214 and 216, or subsets thereof, based on identical pre-provisioned algorithms seeded with corresponding values 160 and 162. In other words, SEDs 220 and 222 may privately compute parity values without disclosure of a parity algorithm, such as a universal hash function.

SEDs 220 and 222 may compute parity values based on one or more conventional techniques, such as a hash-based technique, in combination with seeds 160 and 162.

SEDs 220 and 222 may compute parity values based on pseudo-randomly arranged bits of sifted keys 214 and 216. For example, SEDs 220 and 222 may arrange bits of sifted keys 214 and 216 in a largest square (N by N) matrix compatible with a block size of the sifted keys, using values 160 and 162 to shuffle the bits into the corresponding matrices.

SEDs 220 and 222 privately compute column and row parities of the corresponding matrices, disclose the parity values over channel 116 as parity information 165, and privately compute parity mismatches based on disclosed parity information 165.

Figure 3:
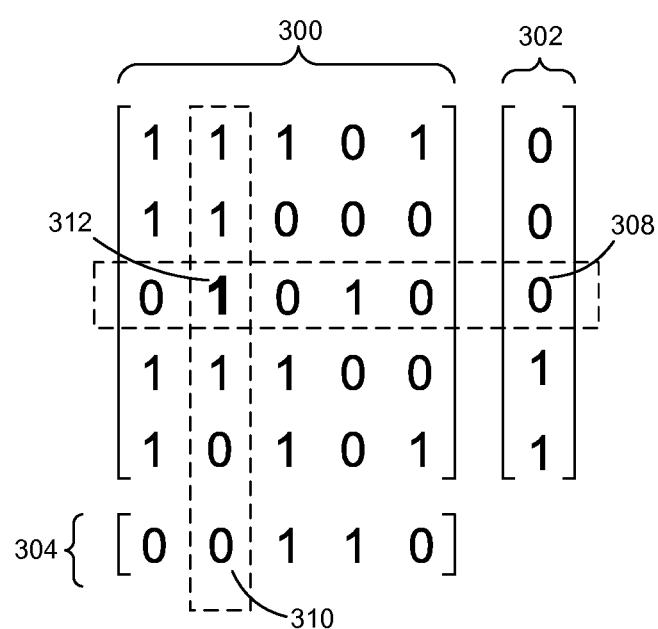
FIG. 3 is a depiction of a matrix of sifted bits, including a column of corresponding row parity bits and a row of corresponding column parity bits.

For example, FIG. 3 is a depiction of a 5-by-5 matrix 300 of sifted bits. FIG. 3 further includes a column 302 of corresponding row parity bits and a row 304 of corresponding column parity bits. Where a row parity bit 308 and a column parity bit 310 do not match corresponding row and column parity bits of reference matrix, intersecting bit 312, or the corresponding bit of the reference matrix may be in error.

In FIG. 2, encryption key managers 180 and 182 include corresponding authenticated encryption key constructors 240 and 242 to selectively construct authenticated encryption keys 184 and 186. In an embodiment, authenticated encryption key constructors 240 and 242 are implemented to construct authenticated encryption keys 184 and 186 only when an extent of errors within sifted keys 214 and 216 is below a threshold. A decision to construct authenticated encryption keys 184 and 186 may represent authentication of systems 102 and 104.

In FIG. 2, SEDs 220 and 222 or constructors 240 and 242 may include identical pre-provisioned error elimination algorithms to correct and/or eliminate errors in respective sifted keys 214 and 216. In FIG. 3, error correction algorithms may change bit 312 sifted key 214 or sifted key 216. Error elimination algorithms may discard bit 312 from sifted keys 214 and 216. Alternatively, error elimination algorithms may discard all bits of the affected row and column from sifted keys 214 and key 216.

Pseudo-random matrix-based arranging, and parity-based error detection, and error elimination may be performed repeatedly with subsequently smaller sets of remaining sifted bits until no parity errors or mismatches are detected in one or more iterations. A minimum number of error-free iterations may be user-configurable.

Remaining, error-free bits of sifted keys 214 and 216 are referred to as corrected encryption keys 224 and 226, respectively.

Failure to converge on error-free corrected keys 224 and 226 may signify an eavesdropper and/or transmission errors on quantum channel 113 in FIG. 1, in which case the authentication session is aborted.

Conversely, error-free corrected keys 224 and 226 may be taken as inherent or implicit authentication of systems 102 and 104 with respect to one another, and corrected keys 224 and 226 may be output as final or authenticated encryption keys 184 and 186. Alternatively, one or more additional security measure may be performed on corrected keys 224 and 226.

For example, constructors 240 and 242 may selectively determine whether to retain corrected keys 224 and 226 based on an error rate or number of remaining bits within the corrected keys. A retain/discard decision may be based on a threshold, which may be user-configurable. The threshold may be set based on a known or presumed capability of a potential adversary. The threshold may also be used to monitor drifts in birefringence of an optical fiber of communication channel 113, which may be compensated through recalibration.

Out of caution, it may be assumed that some fraction of the remaining bits within corrected keys 224 and 226 are known to an adversary. For example, quantum transmitter 110 may include a laser source, which may operate at a mean photon intensity of, for example, approximately 0.1 photons per pulse. Due to the statistical nature of laser sources, approximately 10% of transmission intervals that contain any photons may contain at two or more photons. An adversary could potentially measure the polarization of extra photons without affecting parity error rates or corrected keys 224 and 226.

In FIG. 2, constructors 240 and 242 include corresponding privacy amplifiers (PAs) 228 and 230 to further enhance security of corresponding corrected keys 224 and 226. PAs 228 and 230 may include identical pre-provisioned algorithms to be seeded by values 232 and 234, which may be generated as described above with respect to values 160 and 162.

PAs 228 and 230 may be implemented to generate corresponding PA keys 236 and 238 based on parity values computed from corrected encryption keys 224 and 226, or subsets of bits of corrected keys 224 and 226. As an example, where parities of 10 bits of corrected keys 224 and 226 are used to form PA keys 236 and 238, an adversary would need to know all 10 bits in order to know the parity values used to for PA keys 236 and 238.

PAs 228 and 230 may pseudo-randomly arrange bits of corrected keys 224 and 226 in corresponding matrices based on values 232 and 234, and compute row and column parity values such as described above with respect to SEDs 220 and 222. Unlike SEDs 220 and 222, however, parities computed by PAs 228 and 230 are not disclosed.

For additional privacy amplification, PAs 228 and 230 may repeat the pseudo-random matrix-arranging of bits of corrected keys 224 and 226 with subsequent values 232 and 234, accumulate parity values over multiple repetitions, and construct corresponding PA keys 236 and 238 based on the accumulated parities.

For additional privacy amplification, with each repetition, a column and row of each matrix may be discarded between repetitions until the matrices fall below a threshold size. The threshold size may set based on a known or perceived security risk, and may be user-configurable.

PA keys 236 and 238 may represent final or authenticated encryption keys 184 and 186, convergence of which may inherently or implicitly authenticate systems 102 and 104 with respect to one another.

In addition to authenticating systems 102 and 104 with respect to one another, authenticated encryption keys 184 and 186, may be used for other purposes, such as encryption/decryption of messages, while authentication keys 144 and 146 (modified and/or unmodified) may remain un-disclosed or secret, and may be re-used in subsequent authentication session.

Under the BB84 protocol, authenticated encryption keys 184 and 186 may be used to encode and decode a message with a one-time pad technique, such as a Vernam Cipher, where individual bits of authenticated encryption key 184 are used a single time to encode one bit of the message, and individual bits of authenticated encryption key 186 are used a single time to decode one bit of the received message.

As an example, at system 102, bits of authenticated encryption key 184 are arranged into bytes as the bits become available. The bytes are applied to an exclusive-OR (XOR) operation, along with bits of the message, to generate an encoded message, which may be transmitted over channel 116. At system 104, the bytes of the encrypted message are received and applied to an identical XOR operation, along with bytes of authenticated encryption key 186, to decode the bytes. The encoding and decoding may be repeated until the entire message has been transferred.

FIG. 4 is a block diagram of systems 102 and 104, where system 104 is implemented to insert noise into a detection stream in the form of fictitious or random detection events 402. Random detection events may include random bit values and random detection bases, and may be inserted at random detection intervals amongst valid detection events 126.

Encryption key manager 182 may be implemented to add random detection events 402 to the corresponding raw encryption key, and to remove random detection events 402 from the encryption key during sifting and/or error detection and correction.

Encryption key manager 182 may be implemented to maintain the random bit values, random detection bases, and random detection interval information secret, or without disclosure over channel 116.

Insertion of random detection events 402 may reduce information that an adversary might potentially learn about authentication key 146.

Figure 5:
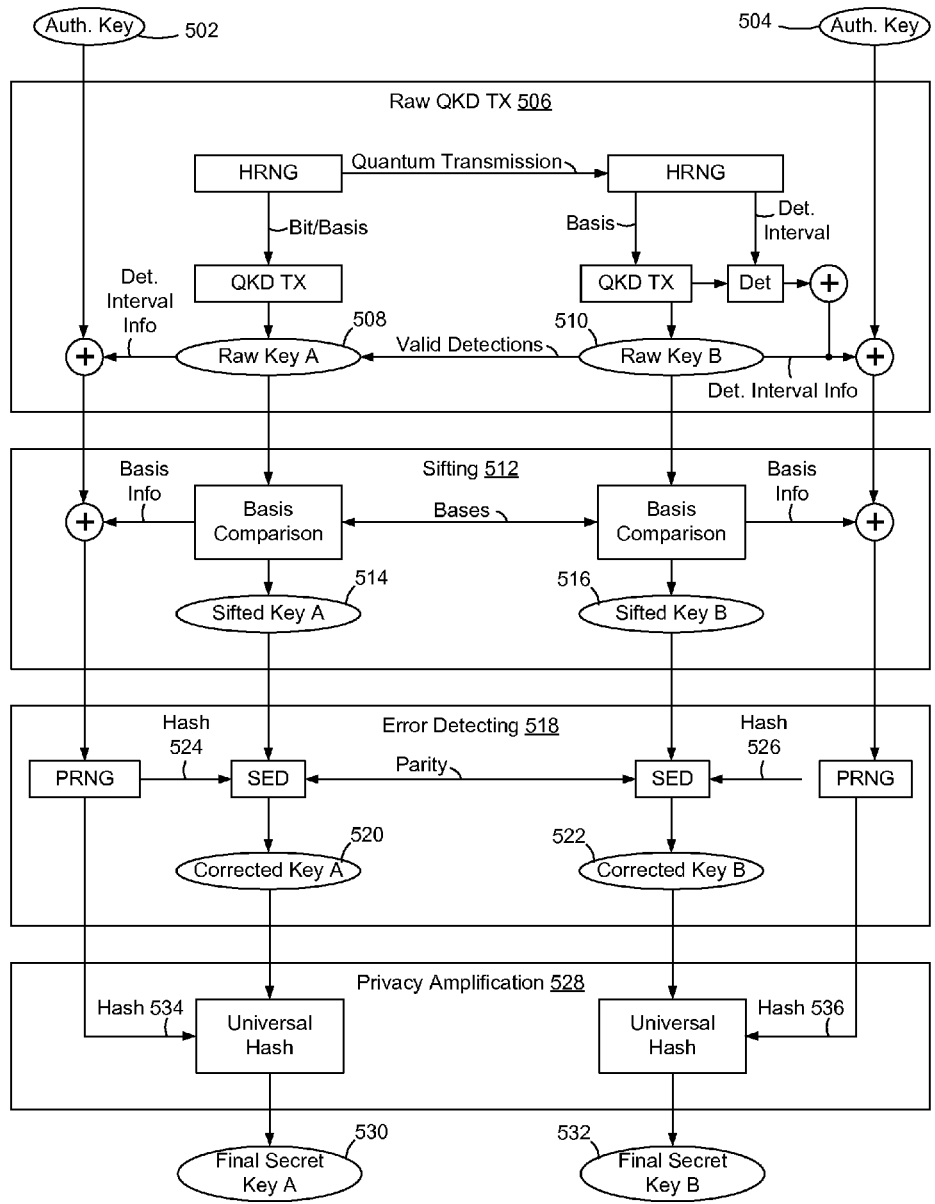
FIG. 5 is a flowchart of method of authenticating users in a QKD environment based on identical pre-provisioned or embedded authentic keys.

FIG. 5 is a flowchart of method 500 of authenticating users in a QKD environment based on identical pre-provisioned or embedded authentic keys 502 and 504.

At 506, a raw key QKD transmission 506 is performed to generate raw keys 508 and 510 and modify authentication keys 502 and 504, such as described in one or more examples above.

At 512, sifting is performed to generate sifted keys 514 and 516 further modify authentication keys 502 and 504, and such as described in one or more examples above.

At 518, error detection is performed to generate corrected keys 520 and 522 based on pseudo-random numbers 524 and 526 generated from corresponding modified authentication keys, and such as described in one or more examples above.

At 528, privacy amplification is performed to generate authenticated encrypted keys, illustrated here as final secret keys 530 and 532, based on pseudo-random numbers 534 and 536 generated from the corresponding modified authentication keys, and such as described in one or more examples above.

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include a transitory and/or non-transitory medium. The processor may include a general purpose instruction processor, a controller, a microcontroller, and/or other instruction-based processor.

Figure 6:
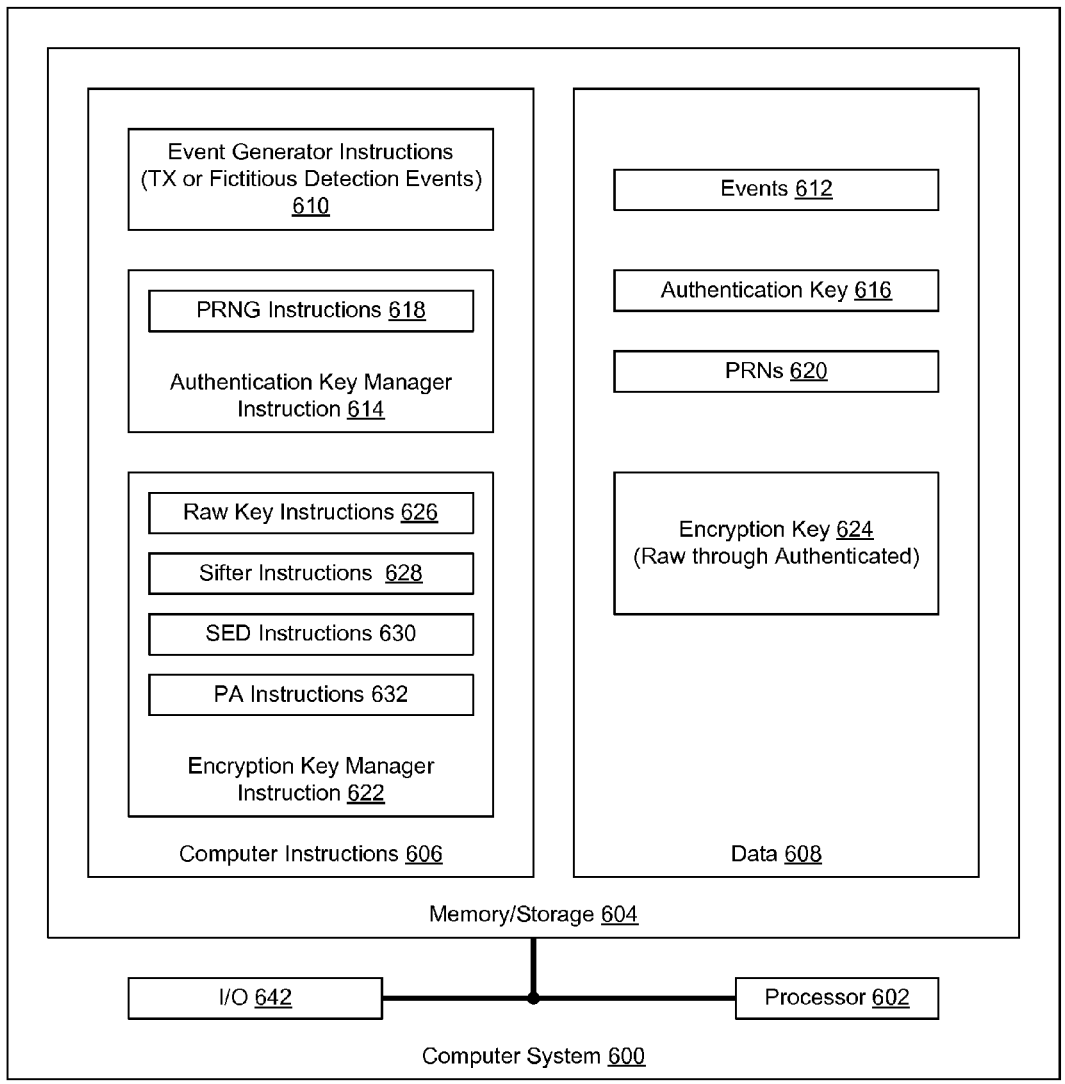
FIG. 6 is a block diagram of a computer system configured to authenticate another system within a QKD environment based on a pre-provisioned or embedded authentication key.

FIG. 6 is a block diagram of a computer system 600, configured to authenticate another system within a QKD environment based on a pre-provisioned or embedded authentication key 616. Similar such computer systems may be implemented each of a QKD transmit system and a QKD receive system, such as described in one or more examples herein.

Computer system 600 includes one or more computer instruction processing units, illustrated here as a processor 602, to execute computer readable instructions.

Computer system 600 further include memory, cache, registers, and/or storage, illustrated here as memory 604, which may include a computer readable medium having computer readable instructions 606 stored therein.

Memory 604 may include data 608 to be used by processor 602 in executing instructions 606, and/or generated by processor 602 in during execution of instructions 606.

In FIG. 6, Instructions 606 include event generator instructions 610 to generate events 612, which may represent events for transmission by a QDK transmitter transmission or fictitious detection events to be inserted into a detection stream at a QDK receiver, such as described in one or more examples above. Where computer system 500 is implemented at a QKD receiver, events 612 may include valid detection events as well as fictitious detection events.

Instructions 606 further include authentication key manager instructions 614 to manage a pre-provisioned or embedded authentication key 616, such as described in one or more examples above. Authentication key manager instructions 614 may include pseudo-random number generator instructions 618 to generate a sequence of pseudo-random numbers 620 based on authentication key 616.

Instructions 606 further include encryption key manager instructions 622 to generate an encryption key 624 based on events 612, such as described in one or more examples above.

Encryption key manager instructions 622 may include raw key instructions 626 to generate an initial raw encryption key, sifter instructions 628 to generate a sifted encryption key based on the raw encryption key, SED instructions 630 to detect and/or eliminate errors in the sifted encryption key, and/or privacy amplification instructions 632 to amplify privacy of a corrected encryption key, such as described in one or more examples above.

Encryption key manager instructions 622 may include instructions to selectively generate a final or authenticated encryption key based on an extent of error's in the raw or sifted key. A decision to generate the final or authenticated encryption key constitutes authentication of the other system, as described in further above.

As described herein, systems 102 and 104 inherently or implicitly authenticate one another when encryption key managers 180 and 182 converge on corresponding encryption keys 184 and 186. Moreover, authentication may be performed without transmitting or consuming any portion of authentication keys 144 and 146, which may be thus be reused.

As further described herein, error correction and/or privacy amplification may be performed based on relatively minimal information exchange and, optionally, with open disclosure of the information.

As further described herein, a quantum receiving system may add noise to a detection stream in the form of fictitious detection events, which may reduce information that an adversary might potentially learn about pre-provisioned authentication keys.

For these reasons, and others, methods and systems disclosed herein may be implemented to reduce communications overhead and resource consumption.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. A quantum key distribution (QKD) system comprising first and second systems, the QKD system configured to authenticate the first and second systems with respect to one another based on quantum events transmitted from the first system to the second system, subsequent disclosures, and corresponding identical pre-provisioned authentication keys, wherein each event includes a bit value encoded as a quantum state based on a quantum basis, and wherein the first and second systems each comprise processing circuitry configured to execute:

an authentication key manager to modify the corresponding pre-provisioned authentication key based on detection interval information and sifted bases information;

an encryption key constructor to construct an encryption key based on a corresponding one of transmitted events and detected events, wherein an encryption key manager of the first system is implemented to discard events of the encryption key based on detection interval information disclosed by the second system;

a sifter to discard events of the encryption key based on the sifted bases information, wherein the first system is implemented to determine the sifted basis information based on differences between transmission bases of the first system and detection bases disclosed by the second system, and to disclose sifted bases information pertaining to the detection bases disclosed by the second system;

an error detector to compute a measure based on the sifted encryption key, one or more pre-provisioned algorithms, and the modified authentication key, and to disclose the computed measure and determine differences between the computed measure and a corresponding measure disclosed by the other system; and an authenticated encryption key constructor to selectively construct an authenticated encryption key depending on the differences determined by the error detector, and to construct the authenticated encryption key based on one or more pre-provisioned algorithms and the modified authentication key without disclosure or consumption of the pre-provisioned authentication key or the modified authentication key with the other system, wherein construction of the authenticated encryption key signifies authentication of the other system, and wherein the authenticated encryption key is used to encrypt or decrypt messages from the other system.

2. The system of claim 1, wherein:
the first and second systems are implemented to maintain the pre-provisioned authentication key and the modified authentication key in secret;
the first system is implemented to maintain transmission interval information, bit values, and bases of the transmitted events in secret, other than the transmission of the quantum events; and
the second system is implemented to maintain bit values of the detected events in secret at the second system.

3. The system of claim 1, wherein the error detector includes:
a first pre-provisioned algorithm to assign bits of the sifted encryption key to a matrix based on the modified authentication key and to compute the measure as row and column parity values of the matrix; and
a second pre-provisioned algorithm to identify row and column parity mismatches between the measures of the first and second systems.

4. The system of claim 3, further including a pre-provisioned algorithm to discard rows and columns of bit values from the sifted encryption key based on the row and column parity mismatches to provide a corrected key.

5. The system of claim 4, wherein:
the first and second algorithms are applied repeatedly until no parity errors are detected over multiple iterations to provide a corrected encryption key; and
the authenticated encryption key constructor is implemented to construct the authenticated encryption key from the corrected encryption key when a size of the corrected encryption key is above a threshold.

6. The system of claim 1, wherein the authenticated encryption key constructor includes:

a privacy amplifier (PA) to construct the authenticated encryption key based on a corrected encryption key, one or more pre-provisioned algorithms, and the modified authentication key.

7. The system of claim 6, wherein the PA is implemented to assign bits of the corrected encryption key to a matrix based on the modified authentication key, compute row and parity values of the matrix, and generate the authenticated encryption key from the parity values.

8. The system of claim 6, wherein:
the PA is implemented to repeatedly assign bits of the corrected encryption key to a matrix based on a sequence of pseudo-random values generated from the modified authentication key, compute and accumulate row and column parity values over multiple repetitions, and generate the authenticated encryption key based on the accumulated parity values.

9. The system of claim 6, wherein:
the PA is implemented to repeatedly assign bits of the corrected encryption key to successively smaller matrices, discard at least one row and one column of bit values from the corrected encryption key between repetitions, accumulate parity values over multiple repetitions, and generate the authenticated encryption key based on the accumulated parity values.

10. The system of claim 1, wherein:
the first and second systems further include identical pseudo-random number generators (PRNGs), each to generate a sequence of pseudo-random numbers (PRNs) based on at least a portion of the modified authentication key and to provide the PRNs to one or more pre-provisioned algorithms.

11. The system of claim 1, wherein:
the second system includes a random event generator to generate fictitious detection events based on random bit values, random detection bases, and random detection intervals; and
the encryption key constructor of the second system is implemented to construct the encryption key based on the detected events and the fictitious detection events.

12. The system of claim 11, wherein the second system is implemented to maintain the random bit values, the random detection bases, and corresponding random detection interval information in secret at the second system, and to remove the fictitious events from the encryption key prior to construction of the authenticated encryption key.

13. A method of authenticating first and second systems with respect to one another based on quantum events transmitted from the first system to the second system, subsequent disclosures, and corresponding first and second identical pre-provisioned authentication keys, wherein each event includes a bit value encoded as a quantum state based on a quantum basis, the method comprising:
constructing first and second encryption keys at the first and second systems based on a corresponding one of transmitted events and detected events;
disclosing detection interval information and detection bases at the second system;
discarding events from the first encryption key based on the disclosed detection interval information;
determining sifted basis information at the first system based on differences between transmission bases and detection bases, and disclosing sifted bases information pertaining to the detection bases;
discarding events of the first and second encryption keys based on the sifted bases information;

modifying the first and second pre-provisioned authentication keys at the first and second systems based on detection interval information and sifted bases information;

computing a measure at each of the first and second systems based on corresponding sifted encryption keys, one or more identical pre-provisioned algorithms, and corresponding modified authentication keys;

disclosing the computed measures;

determine differences between the computed measures at each of the first and second systems; and selectively constructing corresponding authenticated encryption keys in the first and second systems depending on the differences between the computed measures, based on one or more pre-provisioned algorithms and corresponding modified authentication key without disclosure or consumption of the corresponding pre-provisioned authentication key or corresponding modified authentication key with the other system, wherein construction of the authenticated encryption keys signify authentication of the first and second systems, and wherein the authenticated encryption key is used to encrypt or decrypt messages from the other system.

14. The method of claim 13, further including:

maintaining the authentication keys and modified authentication keys in secret at the first and second systems;

maintaining the transmission interval information, transmit bit values, and transmit bases in secret at the first system, other than the transmission of the quantum events; and maintaining the detected bit values in secret at the second system.

15. The method of claim 13, wherein:

the computing of the measure includes assigning bits of the sifted encryption key to a matrix based on the modified authentication key and computing the measure as row and column parity values of the matrix;

the determining of the differences between the computed measures includes identifying row and column parity mismatches between the computed measures;

repeating the computing of the measure and the determining of the differences until no parity errors are detected over multiple iterations to provide a corrected encryption key; and constructing the authenticated encryption key from the corrected encryption key, at the first and second systems, when a size of the corrected encryption key is above a threshold.

16. The method of claim 13, wherein the constructing of the authenticated encryption keys includes:

performing an identical pre-provisioned privacy amplification procedure at each of the first and second systems based on the corrected encryption key and the modified authentication key.

17. The method of claim 16, wherein the privacy amplification procedure includes:

assigning bits of the corrected encryption key to a matrix based on the modified authentication key;

computing row and parity values of the matrix; and generating the authenticated encryption key from the parity values.

18. The method of claim 16, wherein the privacy amplification procedure includes:

repeatedly assigning bits of the corrected encryption key to a matrix based on a sequence of pseudo-random values generated from the modified authentication key;

computing and accumulating row and column parity values over multiple repetitions; and generating the authenticated encryption key based on the accumulated parity values.

19. The method of claim 16, wherein the privacy amplification procedure includes:

repeatedly assigning bits of the corrected encryption key to successively smaller matrices;

discarding at least one row and one column of bit values from the corrected encryption key between repetitions;

accumulating parity values over multiple repetitions; and generating the authenticated encryption key based on the accumulated parity values.

20. The method of claim 13, further including:

generating a sequence of pseudo-random numbers (PRNs) at each of the first and second systems based on at least a portion of the modified authentication key; and providing the sequence of PRNs to one or more of the pre-provisioned algorithms.

21. The method of claim 13, further including:

generating fictitious detection events at the second system based on random bit values, random detection bases, and random detection intervals; and constructing the encryption key of the second system based on the detected events and the fictitious detection events.

22. The method of claim 21, further including:

maintaining the random bit values, the random detection bases, and corresponding random detection interval information in secret at the second systems; and removing the fictitious events from the encryption key prior to constructing the authenticated encryption key.

* * * * *